(12) United States Patent
Warren

(10) Patent No.: US 7,609,381 B2
(45) Date of Patent: Oct. 27, 2009

(54) COMPACT, HIGH-THROUGHPUT SPECTROMETER APPARATUS FOR HYPERSPECTRAL REMOTE SENSING

(75) Inventor: David Wheeler Warren, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 29 days.

(21) Appl. No.: 12/052,705

(22) Filed: Mar. 20, 2008

(65) Prior Publication Data

US 2009/0237657 A1    Sep. 24, 2009

(51) Int. Cl.
  *G01J 3/28* (2006.01)
  *G01J 3/18* (2006.01)
(52) U.S. Cl. ..................................... 356/328
(58) Field of Classification Search ................. 356/326, 356/328
See application file for complete search history.

(56) References Cited

U.S. PATENT DOCUMENTS

| | | | |
|---|---|---|---|
| 5,303,001 A | 4/1994 | Jeong et al. |
| 5,757,493 A | 5/1998 | VanKerkhove |
| 5,995,221 A | 11/1999 | Slutter et al. |
| 6,088,134 A | 7/2000 | Schmidt |
| 6,181,418 B1 | 1/2001 | Palumbo et al. |
| 6,288,781 B1 | 9/2001 | Lobb |
| 6,538,736 B1 | 3/2003 | Palumbo |
| 6,636,350 B2 | 10/2003 | Shafer et al. |
| 6,813,098 B2 | 11/2004 | Mercado |
| 6,844,972 B2 | 1/2005 | McGuire, Jr. |
| 6,863,403 B2 | 3/2005 | Mercado et al. |
| 6,879,383 B2 | 4/2005 | Mercado |
| 6,970,232 B2 | 11/2005 | McGuire, Jr. |
| 6,995,908 B2 | 2/2006 | McGuire |
| 2002/0171815 A1 | 11/2002 | Matsuyama et al. |
| 2002/0195548 A1 | 12/2002 | Dowski, Jr. et al. |
| 2003/0173502 A1 | 9/2003 | Dowski, Jr. et al. |
| 2004/0027653 A1 | 2/2004 | Shafer et al. |
| 2005/0248856 A1 | 11/2005 | Omura et al. |

OTHER PUBLICATIONS

L. Mertz, "Concentric spectrographs," Appl. Opt. 16, 3122-3124 (1977).
D. R. Lobb, "Theory of concentric designs for grating spectrometers," Appl. Opt. 33, 2648-2658 (1994).
D. R. Lobb, "Imaging spectrometers using concentric optics," Proc. SPIE 3118, 339-347 (1997).
P, Mouroulis, D. W. Wilson, P. D. Maker, and R. E. Muller, "Convex Grating Types for Concentric Imaging Spectrometers," Appl. Opt. 37, Issue 31, pp. 7200-7208, Nov. 1, 1998.
P. Mouroulis and R. O. Green, "Optical design for imaging spectroscopy," Proc. SPIE 5173, 18-25 (2003).

*Primary Examiner*—F. L Evans
(74) *Attorney, Agent, or Firm*—Henricks, Slavin & Holmes LLP

(57) ABSTRACT

A spectrometer apparatus includes a refractor element, a slit, a detector, a diffraction grating, and a corrector lens. The refractor element includes a rear surface and a front surface. The slit provides an optical path to the rear surface of the refractor element, and is configured to transmit an image incident thereupon along the optical path. The detector is positioned facing the rear surface of the refractor element. The diffraction grating faces the front surface of the refractor element, and is configured to spectrally disperse and reimage the image of the slit toward the front surface of the refractor element. The corrector lens is positioned between the refractor element and the diffraction grating such that the image is provided to the detector corrected for a spherical aberration caused by a separation distance between the detector and the rear surface of the refractor element.

25 Claims, 5 Drawing Sheets

COMPACT, HIGH-THROUGHPUT SPECTROMETER APPARATUS FOR HYPERSPECTRAL REMOTE SENSING

STATEMENT OF GOVERNMENT INTEREST

The invention was made with Government support under contract number FA8802-04-C-0001 awarded by the Department of the Air Force. The Government has certain rights in the invention.

TECHNICAL FIELD

The invention relates generally to spectrometers and, in particular, to providing spherical aberration correction for infrared spectrometers.

BACKGROUND ART

Hyperspectral imaging is an extremely powerful and broadly applied technique of optical remote sensing. It consists of imaging an object or scene in a multitude of contiguous wavelength intervals. As distinct from multi-spectral imaging, where the wavelength intervals are typically defined by a relatively small number (e.g., <12) of discrete optical bandpass filters, hyperspectral imaging employs a larger number of finer spectral intervals in order to more reliably detect and discriminate between the unique spectral characteristics of natural and artificial materials.

As a tool of remote sensing, for example in geology or astronomy, hyperspectral imaging is generally practical only in wavelength regions where the earth's atmosphere is transparent over ranges of many kilometers and not affected by absorption from atmospheric constituents such as carbon dioxide and water vapor. These regions include the visible and near-infrared (VNIR: 0.4-1.0 µm), short-wave infrared (SWIR: 1.0-2.5 µm), mid-wave infrared (MWIR: 3.0-5.0 µm), and long-wave infrared (LWIR: 8.0-14.0 µm). Depending on the mission and phenomenology of interest, it is common to divide one of these broad spectral regions into 10s or 100s of sampled spectral sub-intervals. Typical numbers range from 32 to 512. These modest spectral resolutions are most practically achieved with spectrometers based on dispersive prism or diffraction grating elements.

The preferred detector for modern hyperspectral instruments is the two-dimensional array of discrete, solid-state electronic sensing elements. Array detectors are available and optimized for each of the wavelength regions and include silicon charge-coupled devices (CCDs) for the VNIR, InGaAs, InSb, and HgCdTe for the SWIR, HgCdTe and InSb for the MWIR, and HgCdTe, extrinsic doped silicon (e.g., Si:As), and microbolometer arrays for the LWIR. Individual element (pixel) sizes range from 8 to 75 µm, and array dimensions presently range from 128 to 1024 elements in each dimension and are not constrained to square formats.

Two common methods of forming hyperspectral images of extended scenes are pushbroom and whiskbroom scanning. Both methods share the attribute of defining an instantaneous spatial area of interest by a long, narrow aperture mask (or slit) at the focus of an imaging system. Typical aspect ratios for slits range from 1:128 to 1:1024. Light from the scene passing through the slit is then spectrally dispersed perpendicular to the long dimension (length) of the slit and reimaged onto a two dimensional detector array. If the slit is parallel to the rows of the detector array, when read out, the rows of the array are then contiguous spectral images of the slit. Alternatively, the columns of the array represent the spectra of each spatial sample in the slit as defined by the array pixels. If the projection of the slit on the object or scene is advanced by its narrow dimension (width) each time the detector array frame is read out, a complete spectral map of every point in a two-dimensional scene is built up over time. Pushbroom and whiskbroom scanning are different in that for the former, the motion of the slit is produced by the motion of the platform (e.g., aircraft or satellite) carrying the hyperspectral imaging sensor, whereas for the latter, the scan direction is perpendicular to the platform motion and is typically accomplished by a scanning mirror directing the sensor line of sight within a defined field of regard.

For a given uniform and continuous scene, the signal collected by a detector element in a hyperspectral imager is proportional to the area of the detector, the angular extent (in two-dimensions, or steradians) of the imaging beam focused on the detector, the spectral sampling interval, and the time the signal is integrated between readouts of the detector array. The product of the first two quantities is equivalent to a metric called the throughput (also etendue or $A\Omega$ product). For high-performance hyperspectral imaging instruments intended to cover large areas with both fine spatial and spectral resolutions, obtaining adequate signal levels in a short integration time depends on achieving the largest possible throughput in the spectrometer instrument, equivalent to a fast focal ratio (f/#) or large numerical aperture (N.A.). Focal ratios of at least f/2.5 (N.A. >0.2) are necessary, and some applications benefit from focal ratios as fast as f/0.7 (N.A. 0.86).

In addition to large numerical aperture, spectrometers for hyperspectral remote sensing must have good image quality relative to the size of the detector element. For reliable processing and interpretation of the hyperspectral data, they should also have low image distortions such that the length of the slit image should not change with wavelength (keystone) and the dispersed position of the slit image for a given wavelength should not change with position along the slit (smile). These distortions should be controlled to a small fraction (e.g., <$\frac{1}{10}$) of a pixel dimension.

Finally, spectrometers intended for aircraft or satellite use, where volume and mass are often highly constrained, must be as compact as possible. This is particularly true of instruments operating at infrared wavelengths, where the entire instrument is cooled to cryogenic temperatures and demands on cooling resources increase dramatically with instrument volume.

For the above set of requirements, one of the best starting designs or solutions is the Dyson spectrometer. It has excellent image quality and low distortion at very large numerical apertures, while at the same time being very compact.

Dyson first demonstrated that a simple concentric arrangement of a piano convex refracting element (lens) and concave mirror would be free of all Seidel aberrations at the design wavelength and center of a field imaged at 1:1 magnification. J. Dyson, "Unit magnification optical system without Seidel aberrations," *J. Opt. Soc. Am.* 49, 713-716 (1959). Higher order aberrations being more sensitive to field than to numerical aperture, Dyson suggested the form could be applied to photolithography of very fine features of limited spatial extent at high numerical aperture, an observation that would subsequently find application in the developing field of microlithography. Mertz later proposed that the Dyson principle could form the basis for a very high throughput spectrometer, and demonstrated a numerical aperture of 0.66 (f/0.7) over a limited field and wavelength range in the ultraviolet using a holographically generated grating in place of the Dyson's concave mirror. L. Mertz, "Concentric spectrographs," *Appl. Opt.* 16, 3122-3124 (1977). Referring to C. G.

Wynne, "Monocentric telescopes for microlithography," *Opt. Eng.* 26, 300-303 (1987), Wynne continued to refine the Dyson form for microlithography in the visible and ultraviolet, correcting the field with cemented refractive elements, but development of the Dyson for spectrographic applications languished until the early 1990's, when it was revived for space applications. D. R. Lobb, "Theory of concentric designs for grating spectrometers," *Appl. Opt.* 33, 2648-2658 (1994); D. R. Lobb, "Imaging spectrometers using concentric optics," *Proc. SPIE* 3118, 339-347 (1997). More recently, Mouroulis and Green considered Dyson designs for visible spectrometry. P. Mouroulis and R. O. Green, "Optical design for imaging spectroscopy," *Proc. SPIE* 5173, 18-25 (2003). However more attention and development has gone into the Offner form and derivatives (Lobb, Mouroulis and Green), which are also based on concentric principles and have some competitive advantages for systems with more modest f/ratios.

In all of these designs, the slit and detector must be in close proximity to the rear face of the thick refracting element characteristic of the Dyson form. This aspect of the design makes it very difficult to mount detector arrays, which may be protected by windows of significant thickness, be recessed into chip carriers, or be surrounded by delicate wire bonds. Previous designs have attempted to ameliorate this drawback by bonding additional elements to the refractive element. However, these techniques will not work for cryogenic infrared instruments, where bonding adhesives will neither transmit nor survive extreme thermal cycling. The best way to simplify focal plane integration is to increase the gap between the focal plane and the rear surface of the refracting element. However, doing so rapidly degrades image quality by introducing spherical aberration, particularly for very high throughput systems. As focal ratios shrink from f/2.5 to f/1.0, the permissible gaps shrink from one or two millimeters down to a fraction of a millimeter, all of which are impractical to implement in practice.

Spherical aberration is the principal driver keeping the image surface close to the rear surface of the Dyson lens. For a given system, the geometric image size due to spherical aberration increases linearly with the image plane relief and also as the cube of the f/ratio as the throughput is increased. At f/1, image quality is unacceptable with only a few hundred microns of relief, not enough to be useful. Thus, although Dyson spectrometers are potentially very attractive because of their compactness, excellent image quality, and high throughput (fast focal ratio), their one drawback in practical implementation is the difficulty in mounting focal planes in close proximity to the refracting element.

It would be helpful to be able to provide a Dyson spectrometer apparatus or system which accommodates a greater distance between the plane containing the entrance aperture (e.g., slit) and detector (e.g., focal plane array) and the rear surface of the Dyson lens without incurring an unacceptable penalty in respect to spherical aberration.

It would be helpful to be able to provide a long-wave infrared (LWIR) imaging spectrometer which accommodates a greater distance between the plane containing the entrance aperture (e.g., slit) and detector (e.g., focal plane array) and the rear surface of the Dyson lens without incurring an unacceptable penalty in respect to spherical aberration, and without the use of cemented optical interfaces.

SUMMARY OF THE INVENTION

Embodiments described herein involve providing a spectrometer apparatus or system with a refracting corrector lens that has an aspheric optical surface introduced in an appropriate point in the spectrometer optical path, such that spherical aberration is corrected, permitting good object and image clearance without introducing other objectionable aberrations. Embodiments described herein provide the benefit of greatly relaxing the constraints on the packaging of the Dyson spectrometer, and thereby expand its utility and applicability to a wider range of applications. Potential markets include: hyperspectral remote sensing, chemical identification, industrial process control, and pyrometry.

In an example embodiment, a spectrometer apparatus includes a refractor element, a slit, a detector, a diffraction grating (concave), and a corrector lens. The refractor element includes a rear surface and a front surface. The slit is configured to transmit an image incident thereupon along an optical path to the rear surface of the refractor element. The detector is positioned facing the rear surface of the refractor element. The diffraction grating faces the front surface of the refractor element, and is configured to spectrally disperse and reimage the image of the slit toward the front surface of the refractor element. The corrector lens is positioned between the refractor element and the diffraction grating such that the image is provided to the detector corrected for a spherical aberration caused by a separation distance between the detector and the rear surface of the refractor element.

In an example embodiment, a spectrometer apparatus includes a refractor element, a slit, a detector, and a diffraction grating (e.g., radially aspheric). The refractor element includes a rear surface and a front surface. The slit is configured to direct an image incident thereupon along an optical path to the rear surface of the refractor element. The detector is positioned facing the rear surface of the refractor element. The diffraction grating faces the front surface of the refractor element, and is configured to spectrally disperse and reimage the image of the slit toward the front surface of the refractor element such that the image is provided to the detector correcting for a spherical aberration caused by a separation distance between the detector and the rear surface of the refractor element.

DISCLOSURE OF INVENTION

Figure 1:
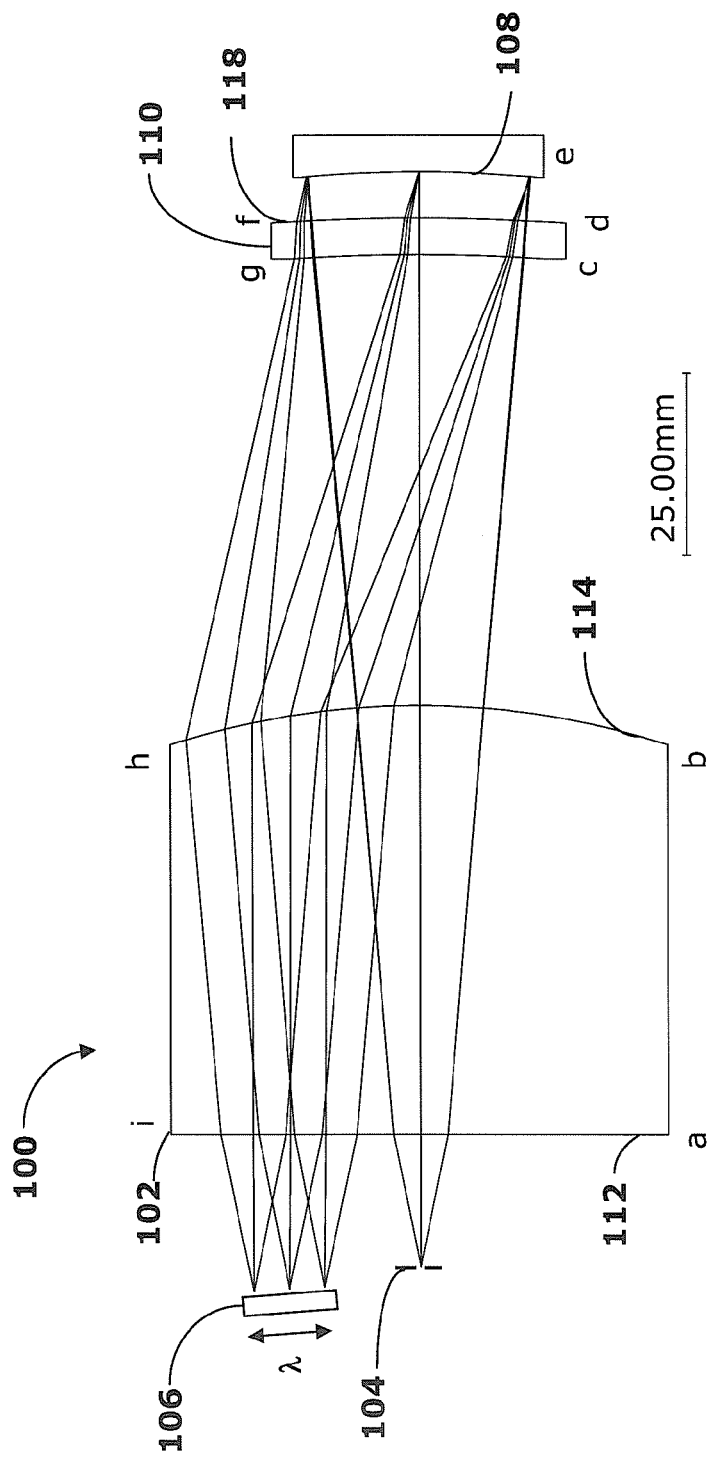
FIG. 1 illustrates an example embodiment of a spectrometer section for an f/2.5 LWIR imaging spectrometer, the spectrometer section including a modified Dyson lens and a corrector lens with an aspheric surface.

Referring to FIG. 1, in an example embodiment, a spectrometer section 100 for an imaging spectrometer includes a refractor element 102, a slit 104, a detector 106, a diffraction grating 108, and a corrector lens 110, configured as shown. The refractor element 102 in this example embodiment is a modified Dyson lens that includes a rear surface 112, which is plano, and a front surface 114, which is spherical but not concentric with the slit or image points.

In relation to spectrometer section embodiments described herein, example baseline LWIR spectrometer system parameters can be specified as follows:

Array: 128×128×75 µm pixels (9.6×9.6 mm)

Dispersion: 7.8-13.4 µm over 9.6 mm

Slit length: 9.6 mm f/ratio: f/2.5

Distortions:
 Wavelength vs Position on Slit (smile)<3 µm (⅕ pixel)
 Slit Position vs Wavelength (keystone)<3 µm (⅕ pixel)

Overall length (slit to grating): ≦150 mm

In this example embodiment, the spectrometer section 100 is configured for an f/2.5 LWIR imaging spectrometer, and includes components configured as shown and dimensions approximately as indicated. It should be appreciated, however, that various modifications to this spectrometer section configuration and these example dimensions are within the scope of the present invention.

There are presently two practical materials for large, thick, Dyson lenses that maintain good transmission over the entire 8-14 µm band: Zinc Selenide (ZnSe) and Sodium Chloride (NaCl). Germanium begins to absorb beyond 12 µm and is therefore not suitable for thick elements. KRS-5 has homogeneity, size, and mechanical (cold flow) drawbacks. Other halides (e.g. KCl, KBr) have no advantage over NaCl in the 8-14 µm band and are harder to handle. Other suitable materials, such as infrared transmitting glasses, may be developed in the future.

CVD ZnSe is a robust material with excellent LWIR transmission. It is straightforward to fabricate (including SPDT) and can be AR coated to high efficiency. Its drawbacks are its cost, its weight ($\rho$=5.27), and the fact that it is virtually impossible to obtain high quality ("prism grade") bulk material thicker than about 60 mm, and that only in limited production. Allowing for cutting and finishing, practical designs for ZnSe cannot have thicknesses larger than about 55 mm in the CVD growth dimension, but can be quite large (e.g 150× 150 mm) in the two other dimensions. The infrared examples described in these disclosures employ ZnSe.

Single-crystal NaCl is grown routinely in large boules, and blanks of any reasonable size are relatively easy to obtain compared to ZnSe. Although it is hygroscopic and subject to cleaving, NaCl is readily fabricated by shops set up to operate with a low humidity environment. AR coating of NaCl, especially for cryogenic operation, is more problematic than for ZnSe, although the much lower refractive index of NaCl makes Fresnel losses tolerable if the material must be used uncoated. Because a cryogenic LWIR spectrometer is normally maintained in vacuum, moisture damage is only a concern when the instrument is open or in the event of a vacuum leak. When the instrument is being assembled or adjusted, heating the NaCl lens above the dew point and providing a local dry nitrogen purge are sufficient to prevent damage from ambient humidity. NaCl would be considered primarily if ZnSe were not available in the size required for a given application.

The slit 104 provides an optical path to the rear surface 112 of the refractor element 102, and transmits an image incident thereupon along the optical path.

The detector 106 is positioned facing the rear surface 112 of the refractor element 102. In this example embodiment, the detector 106, e.g., a focal plane array (FPA), is tilted in relation to the rear surface 112 of the refractor element 102. This tilting of the detector 106 helps to balance image quality, and lessens stray light problems due to back reflections from the detector 106. In an example embodiment, the detector 106 is made from extrinsic doped blocked impurity band (BIB) silicon (e.g., Si:As) or bolometric detector material. Mercury cadmium telluride (HdCdTe) detectors are also suitable.

Table 1 sets forth example construction parameters for the spectrometer section 100 in standard notation.

TABLE 1

Example construction parameters, FIG. 1
(dimensions in mm)

| surface | radius | thickness | material | notes |
|---|---|---|---|---|
| object | plano | 18.035 | vacuum | slit |
| a | plano | 58.829 | ZnSe | |
| b | −108.683 | 61.811 | vacuum | |
| c | −268.985 | 5.000 | ZnSe | |
| d | −291.188 | 6.325 | vacuum | Conic: k = −10.4346 |
| e | −165.928 | −6.325 | reflector | Grating: σ = 0.04563 |
| f | −291.199 | −5.000 | ZnSe | Conic: k = −10.4346 |
| g | −268.985 | −68.811 | vacuum | |
| h | −108.683 | −58.829 | ZnSe | |
| i | plano | −20.000 | vacuum | |
| image | plano | 0 | vacuum | α tilt: 3.682 deg |

The design of imaging spectrometers, and indeed all imaging instruments, is dictated in practice by the available detector materials and formats. Only two materials, HgCdTe and extrinsic silicon (e.g., Si:As BIB), have been developed into workable focal plane arrays for the LWIR band. The physical characteristics of these arrays are summarized in Table 2.

TABLE 2

Candidate detector arrays

| Detector | Format | Pixel Pitch (µm) | Dispersion (mm) | Slit Length (mm) | Operating Temp (K) |
|---|---|---|---|---|---|
| HgCdTe | 256 × 256 | 40 | 10.24 | 10.24 | 40 |
| HgCdTe | 256 × 512 | 40 | 10.24 | 20.48 | 40 |
| Si:As | 128 × 128 | 75 | 9.6 | 9.6 | 10 |
| Si:As | 256 × 256 | 50 | 12.8 | 12.8 | 10 |
| Si:As | 160 × 640 | 40 | 6.4 | 25.6 | 10 |

Although they are more challenging to cool, in an example embodiment, Si:BIB focal planes are favored for their superior uniformity and operability (low number of "bad" pixels) compared to LWIR HgCdTe. We have observed that the missing or low-quality data resulting from inoperable pixels or poor non-uniformity corrections have a serious negative impact on confidence of detection and false-alarm rates. Recent internal simulations beginning with high quality real data have demonstrated that 5% missing data (95% operability), typical for LWIR HgCdTe focal planes, results in detection thresholds that are 2 to 4-times worse than for a fully operational focal plane at the same signal-to-noise ratio.

The diffraction grating 108, faces the front surface 114 of the refractor element 102, and is configured to spectrally disperse and reimage the image of the slit toward the front surface 114 of the refractor element 102. By way of example, the diffraction grating 108 has a groove spacing of 45.6 µm. It should be appreciated however that different groove spacings can be employed.

In an example embodiment, the diffraction grating 108 is concave and spherical. In an example embodiment, the diffraction grating 108 is not strictly concentric in relation to the location of the slit 104.

In this example embodiment, the convex spherical surface of the Dyson lens and concave spherical surface of the grating are not concentric about the slit. In a traditional Dyson lens designed according to the prior art, the radius of curvature of the convex Dyson face (and hence the axial thickness of the Dyson lens) is approximately (n−1)/n of the overall length from the slit to the grating, where n is the refractive index of the lens material. In example embodiments, the convex spherical surface of the Dyson lens is modified to have a longer radius of curvature than the traditional Dyson lens, and so the convex spherical surface is no longer concentric with respect to the slit or the diffraction grating. This longer radius may be thought of as closer to (but not exactly) concentric with the apparent position of the slit after refraction by the rear surface 112 of the modified Dyson lens. In other words, if the light rays propagating inside the Dyson lens material are projected backward to a virtual point of origin, a virtual image of the slit, this virtual image is closer to the center of curvature of the convex front surface 114 than the physical slit itself. Such a lens is referred to herein as a "modified Dyson lens".

The corrector lens 110 is positioned between the refractor element 102 and the diffraction grating 108 such that the image is provided to the detector 106 corrected for a spherical aberration caused by a separation distance between the detector 106 and the rear surface 112 of the refractor element 102. The corrector lens 110 (e.g., a thin refracting element) includes an aspheric (e.g., hyperbolic) surface 118 facing the diffraction grating 108. In an example embodiment, the surfaces of the corrector lens 110 are not concentric in relation to the location of the slit 104.

The aspheric surface 118 of the corrector lens 110 compensates for the spherical aberration introduced by the larger focal plane relief, maintaining good image quality while greatly improving access to the focal plane. In other words, the aspheric corrector lens 110 provides increased focal plane relief. Thus, for example, the spectrometer apparatus 100, with corrector lens 110 and its resulting improved focal plane relief, can serve as the spectrometer section of an f/2.5 modified Dyson spectrometer.

In the Dyson form, object and image relief tend to be symmetric and equal, so achieving good image relief also permits greater relief on the object (slit) side of the system. This relief on the slit side can be used to optically fold the slit position away from the detector position, further facilitating mounting of the detector array.

Figure 2:
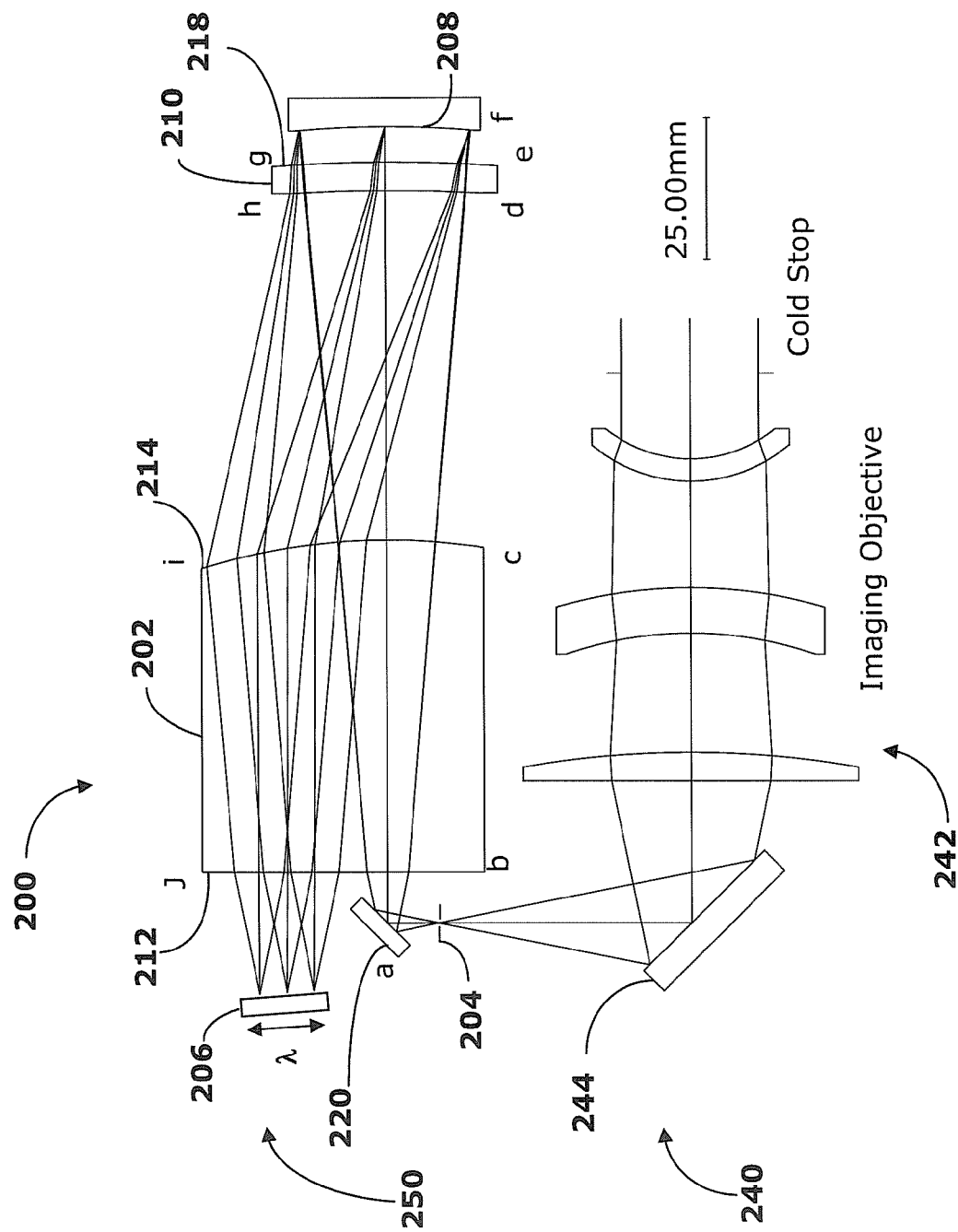
FIG. 2 illustrates an example embodiment of a spectrometer section for an f/2.5 LWIR imaging spectrometer system, the spectrometer section including a truncated modified Dyson lens with a fold mirror, and the imaging objective including a fold mirror and an aperture stop.

Referring to FIG. 2, in another example embodiment, an imaging spectrometer system 200 includes an imager section 240 and a spectrometer section 250. The imager section 240 is configured to provide a telecentric image at the slit, with the central ray from each field position perpendicular to the plane containing the slit, and, in this example embodiment, includes an imaging objective 242 and a fold mirror 244 configured as shown. In this example embodiment, the imager section 240 (imaging objective 242 with cold stop) and spectrometer section 250 are suitable for integration into a self-contained cryogenic package.

Table 3 sets forth example construction parameters for the imaging spectrometer system 200 in standard notation.

TABLE 3

Example construction parameters, FIG. 2 (dimensions in mm)

| surface | radius | thickness | material | notes |
|---------|--------|-----------|----------|-------|
| object  | plano  | 10.000    | vacuum   | slit  |
| a       | plano  | −8.035    | reflector| Fold, 45 degree |
| b       | plano  | −58.829   | ZnSe     |       |
| c       | 108.683| −61.811   | vacuum   |       |
| d       | 268.985| −5.000    | ZnSe     |       |
| e       | 291.188| −6.325    | vacuum   | Conic: k = −10.4346 |
| f       | 165.928| 6.325     | reflector| Grating: σ = 0.04563 |
| g       | 291.199| 5.000     | ZnSe     | Conic: k = −10.4346 |
| h       | 268.985| 68.811    | vacuum   |       |
| i       | 108.683| 58.829    | ZnSe     |       |
| j       | plano  | 20.000    | vacuum   |       |
| image   | plano  | 0         | vacuum   | α tilt: 3.682 deg |

The spectrometer section 250 includes a refractor element 202, a slit 204, a detector 206, a diffraction grating 208, and a corrector lens 210, configured as shown. The refractor element 202 in this example embodiment is a modified truncated Dyson lens that includes a rear surface 212, which is piano, and a front surface 214, which is spherical. Comparing FIG. 2 with FIG. 1, the truncation refers to removing the lower, unused portion of the radially symmetric modified Dyson lens such that the remaining material is only that required to transmit the light rays traversing to and from the diffraction grating. As a practical matter, and to conserve material, the truncated, asymmetric lens may be fabricated directly by tilting the block of lens material while generating the convex spherical front surface 214, according to practices well understood by those skilled in the art of optical fabrication.

The spectrometer section 250 is similar to the spectrometer section 100, except as noted. In addition to the refractor element 202 being a truncated modified Dyson lens, the spectrometer section 250 further includes a mirror 220 (e.g., a fold mirror) between the slit 204 and the rear surface 212 of the refractor element 202. In this example embodiment, the modified Dyson lens is not concentric with respect to the slit 204 and is truncated, which conserves material and decreases weight and volume. With the addition of the corrector lens 210, the powered face of the Dyson lens assumes a longer radius than were it to satisfy the concentric condition of the basic Dyson form.

In this example embodiment, the spectrometer section 250 is configured for an f/2.5 LWIR imaging spectrometer, with corrector lens 210 to increase slit and focal plane relief, and includes components configured as shown and dimensions approximately as indicated. It should be appreciated, however, that various modifications to this spectrometer section configuration and these example dimensions are within the scope of the present invention.

True concentric design forms are known to be prone to stray light problems because multiple reflections between surfaces tend to be imaged back on the focal plane in relatively tight focus. By departing from the concentric condition, the corrected Dyson avoids most of the serious stray light mechanisms. Corrected Dyson forms have been modeled both deterministically (CODEV) and stochastically (FRED)

and no major stray light issues have been discovered. Table 4 summarizes some of the stray light mechanisms and consequences.

TABLE 4

Stray Light Mechanisms

| Mechanism | Consequence |
|---|---|
| Other grating orders | Operates in +1 order |
| | 0 order (undispersed) misses slit and FPA |
| | +2 order misses FPA, short I blocking required - orders may reflect from bottom of Dyson lens |
| Ghost reflections from corrector faces to grating | Attenuated by AR coating, out of focus at FPA |
| Double reflection between corrector faces | Attenuated by AR coating and dispersion |
| Ghost reflection from convex Dyson lens face (outside) | Attenuated by AR coating Diverged, misses grating and FPA |
| Ghost reflection from convex Dyson lens face (inside) | Attenuated by AR coating Falls between slit and FPA |

Figure 3:
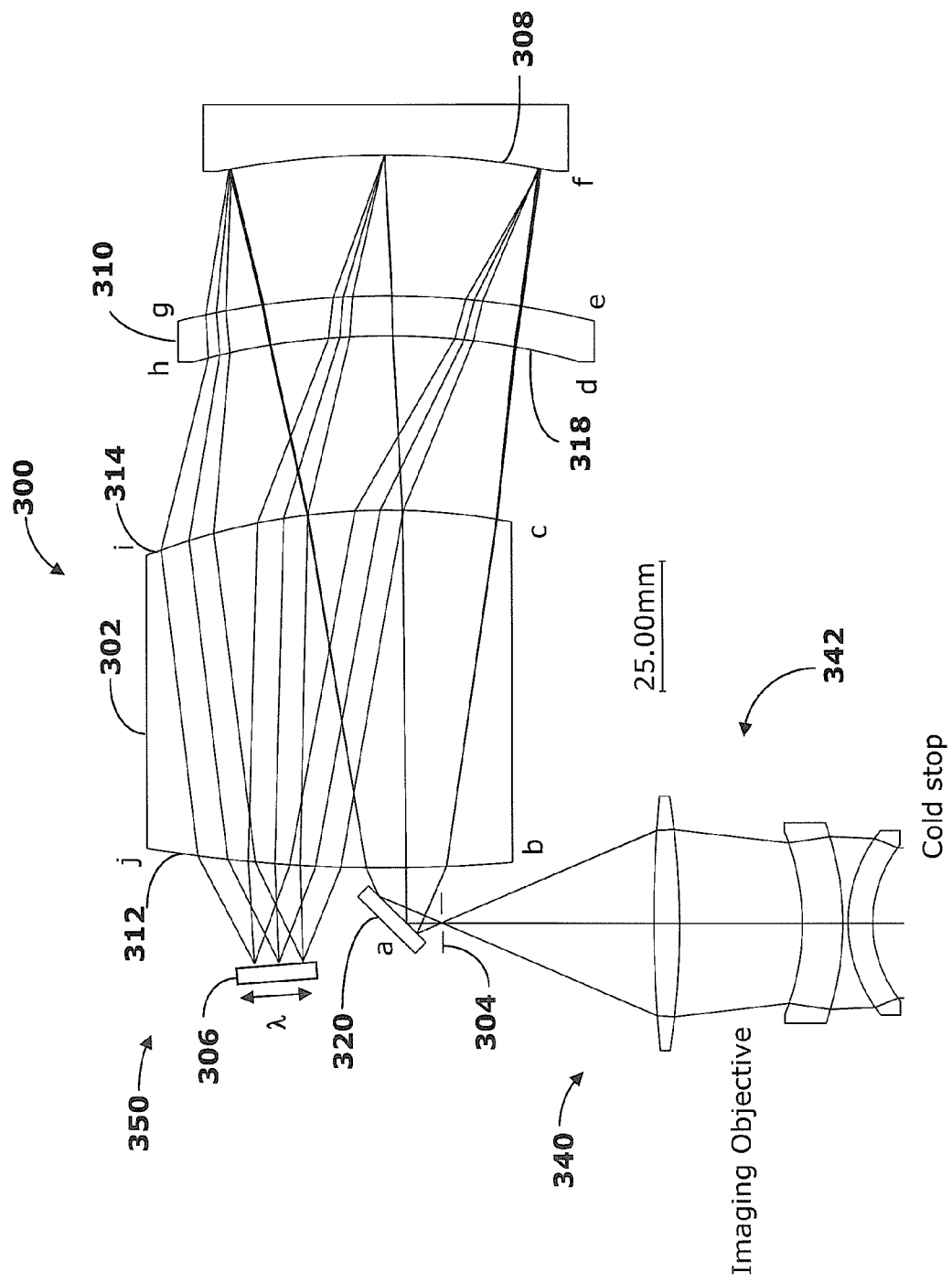
FIG. 3 illustrates an example embodiment of a spectrometer section for an f/1.25 LWIR imaging spectrometer system, the spectrometer section including a truncated modified Dyson lens with a fold mirror, and the imaging objective including an aperture stop.

Referring to FIG. 3, in an example embodiment, an imaging spectrometer system 300 includes an imager section 340 and a spectrometer section 350. The imaging spectrometer system 300 is similar to the imaging spectrometer system 200, except as noted, a principle difference being that the imaging spectrometer system 300 is configured with increased throughput to increase signal/noise or decrease integration time.

Table 5 sets forth example construction parameters for the imaging spectrometer system 300 in standard notation.

TABLE 5

Example construction parameters, FIG. 3
(dimensions in mm)

| surface | radius | thickness | material | notes |
|---|---|---|---|---|
| object | plano | 7.000 | vacuum | slit |
| a | plano | −11.000 | reflector | Fold, 45 degree |
| b | −291.154 | −71.310 | ZnSe | |
| c | 127.919 | −34.691 | vacuum | |
| d | 152.008 | −8.000 | ZnSe | Asphere: k = +3.2456 $r^6 = -0.957e^{-11}$ $r^8 = -0.281e^{-14}$ |
| e | 170.804 | −27.999 | vacuum | |
| f | 168.847 | 27.999 | reflector | Grating: σ = 0.04604 |
| g | 170.804 | 8.000 | ZnSe | |
| h | 152.008 | 34.691 | vacuum | Asphere: k = +3.2456 $r^6 = -0.957e^{-11}$ $r^8 = -0.281e^{-14}$ |
| i | 127.919 | 71.310 | ZnSe | |
| j | −291.154 | 18.000 | vacuum | |
| image | plano | 0.000 | vacuum | α tilt: 2.2307 deg |

The imager section 340 is configured to provide a telecentric image at the slit and, in this example embodiment, includes an imaging objective 342. The spectrometer section 350 includes a refractor element 302 (e.g., a truncated ZnSe lens), a slit 304, a detector 306 (e.g., FPA, slightly tilted), a mirror 320, a diffraction grating 308, and a corrector lens 310, configured as shown. The refractor element 302 in this example embodiment includes a rear surface 312 and a front surface 314 which are both convex and spherical.

As noted above, the imaging spectrometer system 300 is configured with increased throughput (f/ratio) to provide increased signal/noise. FIG. 3 shows the results of pushing the baseline ZnSe system 200 to f/1.25. Although no longer diffraction limited because of the fast f/ratio, the image quality is sufficiently good for the Modulation Transfer Function (MTF) to be within a few percent of diffraction limited at the pixel Nyquist frequency (6.66 lp/mm) of a 75 micron detector pixel. It should be noted that the f/1.25 solution shown in this example embodiment has been completely freed from the strict Dyson geometry in order to optimize overall performance. In particular, the rear surface 312 of the lens 302 has a spherical curvature and the corrector lens 310 has been repositioned as shown between the lens 302 and the diffraction grating 308, where the aspheric 318 is now more beneficial on the surface of the corrector lens 310 facing the lens 302.

In this example embodiment, the spectrometer section 350 is configured for an f/1.25 LWIR imaging spectrometer system, and includes components configured as shown and dimensions approximately as indicated. It should be appreciated, however, that various modifications to this spectrometer section configuration and these example dimensions are within the scope of the present invention.

FIG. 3 also conveys how a refractive objective can be incorporated inside the cryostat to make a self-contained imaging unit, i.e., cryogenic objective. In example embodiments, the imaging spectrometer sections are configured to have a focal ratio between approximately f/2.5 and f/0.7. In other words, the principles described herein facilitate driving the throughput of the classical Dyson form into the range of f/2.5 to f/0.7 while maintaining focal plane accessibility.

Figure 4:
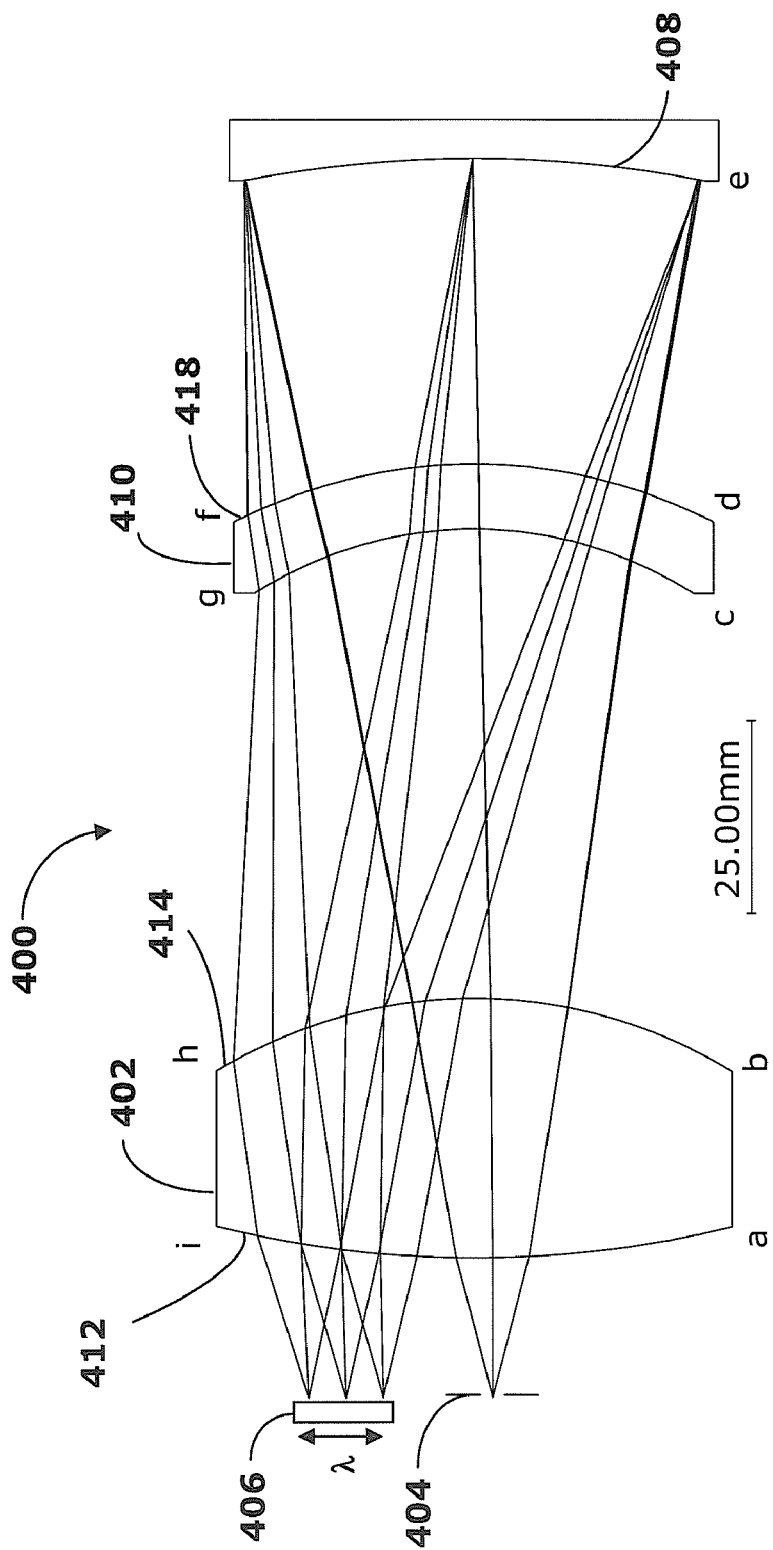
FIG. 4 illustrates an example embodiment of a spectrometer section for an f/2.0 VNIR imaging spectrometer system, the spectrometer section including a modified Dyson lens.

Referring to FIG. 4, in an example embodiment, a spectrometer section 400 for an imaging spectrometer designed for use at visible and near infrared wavelengths includes a refractor element 402, a slit 404, a detector 406 (e.g., a silicon detector), a diffraction grating 408, and a corrector lens 410, configured as shown. The refractor element 402 in this example embodiment is a modified Dyson lens that includes a rear surface 412 and a front surface 414, both of which are spherical as shown.

Table 6 sets forth example construction parameters for the spectrometer section 400 in standard notation.

TABLE 6

Example construction parameters, FIG. 4
(dimensions in mm)

| surface | radius | thickness | material | notes |
|---|---|---|---|---|
| object | plano | 18.000 | air | slit |
| a | 135.544 | 33.530 | Fused silica | |
| b | −62.544 | 60.668 | air | |
| c | −51.931 | 8.413 | Fused silica | |
| d | −66.381 | 39.389 | air | Conic: k = −0.1317 |
| e | −155.519 | −39.389 | reflector | Grating: σ = 0.005526 |
| f | −66.381 | −8.413 | Fused silica | Conic: k = −0.1317 |
| g | −51.931 | −60.668 | air | |
| h | −62.544 | −33.530 | Fused silica | |
| i | 135.544 | −18.000 | air | |
| image | plano | 0.000 | air | α tilt: 0.169 deg |

The spectrometer section 400 is similar to the spectrometer section 350, except as noted, a principle difference being that the refractor element 402 and the corrector lens 410 are both made of fused silica for use at wavelengths between 450 and 900 nanometers.

In this example embodiment, the spectrometer section 400 is configured for an f/2.0 VNIR (450-900 nanometer) imaging spectrometer system, and includes components configured as shown and dimensions approximately as indicated. It should be appreciated, however, that various modifications to this spectrometer section configuration and these example dimensions are within the scope of the present invention.

A preferred way to correct the spherical aberration of a Dyson spectrometer is with a radially symmetric aspheric surface profile on the diffraction grating, which is a pupil of the imaging path between the object and image. However, such an aspheric profile complicates the production of the linear diffraction grating rulings by mechanical means (e.g., diamond ruling), because each point along a linear grating groove lies at a different radial distance from the center of the grating. The required extra dimension of motion in the ruling tool point while the groove is being cut increases the potential for positional errors, resulting in reduced diffraction efficiency and increased stray light. This would not necessarily be true of gratings produced by non-mechanical means, such as holographic gratings or gratings produced by electron beam or x-ray lithography. In these techniques, which are well understood and mature, the groove profile is exposed into a sensitive recording medium (such as dichromated gelatin, photo-resist, or polymer (e.g. poly(methyl methacrylate)) by a suitably modulated beam of photons or electrons. The medium is subsequently processed to develop the desired groove profile. Because the recording process is non-contacting, it is easier to incorporate higher-order spatial information into the exposure, as is required to produce a radially aspheric grating.

Figure 5:
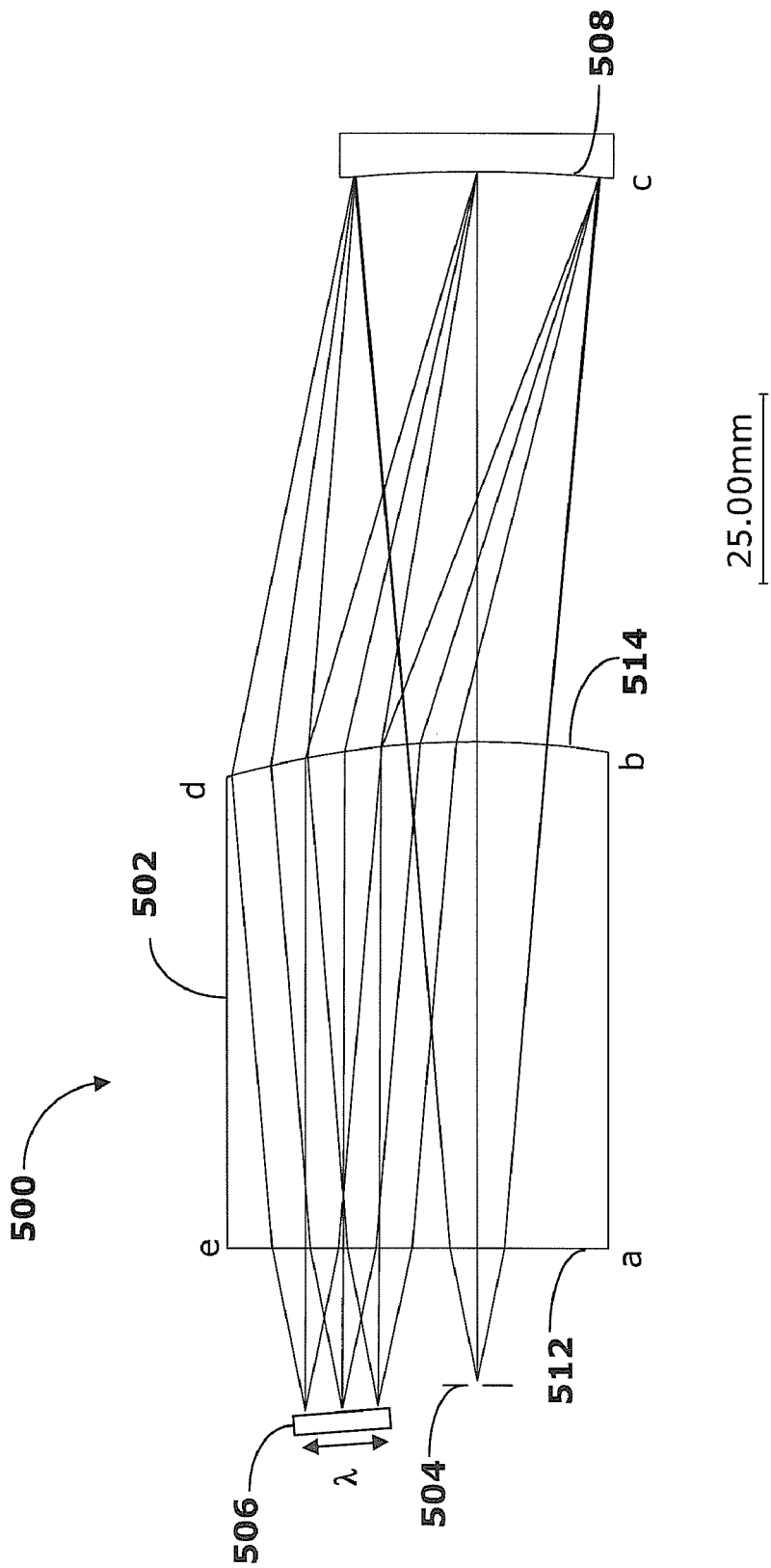
FIG. 5 illustrates an example embodiment of a spectrometer section for an imaging spectrometer system, the spectrometer section including a truncated modified Dyson lens and, instead of a corrector lens, a radially aspheric diffraction grating; the modified Dyson lens and grating are not concentric with the slit or with each other.

Referring to FIG. 5, in an example embodiment, a spectrometer section 500 for an imaging spectrometer includes a refractor element 502, a slit 504, a detector 506, and a diffraction grating 508, configured as shown. The refractor element 502 in this example embodiment is a truncated Dyson lens (e.g., ZnSe lens) that includes a rear surface 512, which is piano, and a front surface 514, which is spherical.

Table 7 sets forth example construction parameters for the spectrometer section 500 in standard notation.

TABLE 7

Example construction parameters, FIG. 5
(dimensions in mm)

| surface | radius | thickness | material | notes |
|---------|--------|-----------|----------|-------|
| object | plano | 17.535 | vacuum | slit |
| a | plano | 67.067 | ZnSe | |
| b | −116.400 | 75.399 | vacuum | |
| c | −184.362 | −75.399 | reflector | Grating: $\sigma$ = 0.0483, Conic: k = −2.568 |
| d | −116.40 | −67.067 | vacuum | |
| e | plano | −20.000 | reflector | |
| image | plano | 0.000 | vacuum | $\alpha$ tilt: 3.697 deg |

The spectrometer section 500 is similar to the spectrometer section 200, except as noted, a principle difference being that it is a modified Dyson design with the aspheric correction on the diffraction grating 508 instead of a corrector lens to permit focal plane relief.

In this example embodiment, the spherical front face 514 of the refractor element 502 and the diffraction grating 508 are not concentric with the slit 504, or with each other. The diffraction grating 508 can be a mechanical ruling (e.g., diamond ruling) or non-mechanical ruling (e.g., holographic). It is believed that correcting the spherical aberration with an aspheric, whether on the grating or on a corrector lens, allows the surfaces to depart from concentricity while still maintaining the other desirable properties of the Dyson—e.g., low distortion, fast f/ratio. The lack of concentricity is itself desirable, as it avoids many of the problems with stray light in the concentric form.

In this example embodiment, the spectrometer section 500 is configured for an imaging spectrometer system, the spectrometer section including a truncated modified Dyson lens and, instead of a corrector lens, a radially aspheric profile on the diffraction grating, and includes components configured as shown and dimensions approximately as indicated. It should be appreciated, however, that various modifications to this spectrometer section configuration and these example dimensions are within the scope of the present invention.

In the interest of clarity, some but not all of the spectrometer section embodiments described herein were discussed in conjunction with imager sections. It should be appreciated that all of spectrometer section embodiments described herein can be provided with imager sections.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A spectrometer apparatus comprising:
   a refractor element including a rear surface and a front surface;
   a slit configured to transmit an image incident thereupon along an optical path to the rear surface of the refractor element;
   a detector positioned facing the rear surface of the refractor element;
   a diffraction grating facing the front surface of the refractor element, the diffraction grating being configured to spectrally disperse and reimage the image of the slit toward the front surface of the refractor element; and
   a corrector lens positioned between the refractor element and the diffraction grating such that the image is provided to the detector corrected for a spherical aberration caused by a separation distance between the detector and the rear surface of the refractor element.

2. The spectrometer apparatus of claim 1, wherein the refractor element is a modified Dyson lens.

3. The spectrometer apparatus of claim 1, wherein the refractor element is a truncated modified Dyson lens.

4. The spectrometer apparatus of claim 1, wherein the front surface of the refractor element is not concentric in relation to the slit.

5. The spectrometer apparatus of claim 1, wherein the front surface of the refractor element is convex and spherical.

6. The spectrometer apparatus of claim 5, wherein the rear surface of the refractor element is plano or convex and spherical.

7. The spectrometer apparatus of claim 1, wherein the diffraction grating is concave and spherical.

8. The spectrometer apparatus of claim 1, wherein the corrector lens includes an aspheric surface facing the diffraction grating.

9. The spectrometer apparatus of claim 1, wherein the refractor element and corrector lens are made from ZnSe.

10. The spectrometer apparatus of claim 1, wherein the refractor element is made from sodium chloride (NaCl).

11. The spectrometer apparatus of claim 1, wherein the refractor element and corrector lens are made from fused silica.

12. The spectrometer apparatus of claim 1, wherein the detector is tilted in relation to the rear surface of the refractor element.

13. The spectrometer apparatus of claim 1, further including:
   a mirror between the slit and the rear surface of the refractor element.

14. The spectrometer apparatus of claim 1, further including:
an imager section configured to provide a telecentric image to the slit.

15. The spectrometer apparatus of claim 14, wherein the imager section includes an imaging objective.

16. The spectrometer apparatus of claim 15, wherein the imager section includes a fold mirror positioned between the imaging objective and the slit.

17. A spectrometer apparatus comprising:
a refractor element including a rear surface and a front surface;
a slit configured to transmit an image incident thereupon along an optical path to the rear surface of the refractor element;
a detector positioned facing the rear surface of the refractor element; and
a diffraction grating facing the front surface of the refractor element, the diffraction grating being configured to spectrally disperse and reimage the image of the slit toward the front surface of the refractor element such that the image is provided to the detector corrected for a spherical aberration caused by a separation distance between the detector and the rear surface of the refractor element.

18. The spectrometer apparatus of claim 17, wherein the diffraction grating is radially aspheric.

19. The spectrometer apparatus of claim 17, wherein the diffraction grating is a mechanical ruling.

20. The spectrometer apparatus of claim 17, wherein the diffraction grating is a non-mechanical ruling.

21. The spectrometer apparatus of claim 17, wherein the diffraction grating is produced by electron beam or x-ray lithography.

22. The spectrometer apparatus of claim 17, wherein the diffraction grating is holographic.

23. The spectrometer apparatus of claim 17, wherein the refractor element is a truncated modified Dyson lens.

24. The spectrometer apparatus of claim 17, wherein the front surface of the refractor element is not concentric in relation to the slit.

25. The spectrometer apparatus of claim 17, wherein the front surface of the refractor element is convex and spherical.

* * * * *